R. C. ANDERSON.
Galvanic-Battery.
No. 223,212. Patented Jan. 6, 1880.
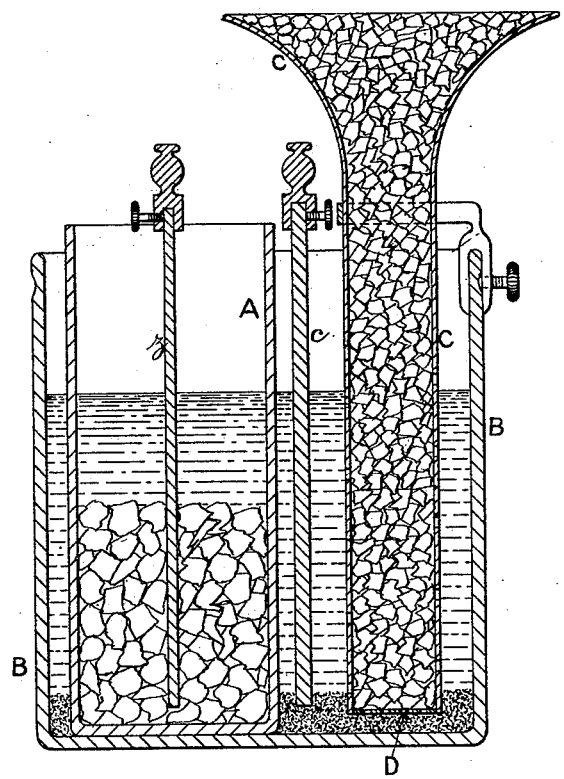
Witnesses
Penn Halsted
M Halsted Mellach
Inventor
Robert Chapman Anderson
by John J. Halsted
Atty.

UNITED STATES PATENT OFFICE.

ROBERT C. ANDERSON, OF WOODGREEN, COUNTY OF MIDDLESEX, ENGLAND.

GALVANIC BATTERY.

SPECIFICATION forming part of Letters Patent No. 223,212, dated January 6, 1880.

Application filed October 29, 1879.

*To all whom it may concern:*

Be it known that I, ROBERT CHAPMAN ANDERSON, of Woodgreen, in the county of Middlesex, England, have invented certain Improvements in Galvanic Batteries, of which the following is a specification.

This invention relates to improvements in galvanic batteries, the object of the improvements being to equalize and regulate the action and maintain the power and constancy of such batteries, and at the same time to almost entirely avoid the production of the noxious and deleterious fumes or emanations usually emitted from certain batteries, more particularly those generally employed in producing the electric light.

In carrying out my improvements for a two-fluid battery I employ, by preference, the ordinary positive and negative elements, such as zinc and carbon, the former of which may be acted upon by any suitable acid—say, for example, sulphuric or muriatic acid or the salt of an acid—say, for example, a sulphate or a muriate; but for the latter or negative element I employ oxalic acid (to which I add a suitable acid or a salt of an acid) in combination with any solution containing chromium or chromic acid, such that the oxalic acid will so combine chemically with the chromium or chromic acid contained in such solution as to form oxalate of chromium either simply or combined with the base or salt of a chromate or bichromate—as, for example, chromate or bichromate of potash. For a one-fluid battery I employ the negative solution only.

I will now proceed to more particularly describe the best means with which I am acquainted for carrying my invention into effect, reference being had to the accompanying drawing, which shows a sectional elevation of a battery illustrating my improvements.

In a two-fluid battery I employ, as hereinbefore described, the ordinary zinc and carbon elements $z$ and $c$, which are separated by a porous pot, A, or other device, one of the fluids being placed in the porous pot A or other device, and the other fluid in a jar, B, on the bottom of which the porous pot A rests. I use, preferably, muriate of ammonia as the exciting-fluid for the zinc or positive element, and oxalate of chromium and potash in combination with free bichromate of potash and muriatic acid for the carbon or negative element.

Oxalate of chromium and potash may be formed by neutralizing a solution of bichromate of potash with oxalic acid until effervescence ceases, or by mixing almost any oxalate with bichromate of potash, whereby, either with or without the assistance of acid for dissolving the said oxalate, oxalate of chromium and potash is formed by the superior affinity of oxalic acid for chromium and potash over almost any other base or salt.

The negative portion of the cell may therefore be charged in various ways—as, for instance, by placing in the muriatic acid any oxalate, such as oxalate of copper or of ammonia, and adding bichromate of potash, whereby oxalate of chromium and potash is more or less quickly formed in the cell; but the mode I have found it advantageous to adopt is to add oxalic acid to a solution of bichromate of potash until effervescence ceases, and then to slowly evaporate the solution, whereby crystals of the oxalate of chromium and potash will be obtained. A sufficient quantity of this salt is then placed in the bottom of the carbon-cell, together with about an equal quantity of crystals of bichromate of potash and muriatic acid, either pure or more or less diluted with water, according to the strength of the solution required, and the carbon is then placed in this solution. Instead of dropping the crystals or other agents loosely into the cell containing the negative solution, as has hitherto been generally the practice, I regulate the strength of galvanic batteries by inclosing the crystals of bichromate of potash or other agents in an adjustable glass tube, C, open at the top and having a bottom, D, of perforated platinum or of platinum wire gauze, or the tube itself may be perforated either at the bottom or sides, or both, and immerse such tube in the negative solution to a greater or less depth. The greater the depth of immersion of the tube the stronger the power of the battery, as more crystals are then exposed to the action of the solution. In this way, by adjusting the depth to which I immerse the tube, I regulate the strength of the battery, and by giving a funnel shape to the upper end of the tube I increase the capacity, and can thereby store sufficient bichromate to automatically feed the solution to exhaustion.

For a one-fluid battery I make use of the hereinbefore-described solution surrounding the negative element as a solution common to both zinc and carbon, by this means doing away with the porous pot and the separate exciting-acid for the zinc element, whereby the action of the battery, although of much shorter duration than in the hereinbefore-described two-fluid battery, will be rendered much more intense, and the internal resistance of the cell will be less.

It will be understood that the two-fluid form of battery is that which I employ where great constancy combined with a certain degree of power extending over a considerable period of time is required—as, for instance, for telegraph-work, the ringing of electric bells, and (where used in a sufficient number of cells) for the driving of electro-motors and the production of the electric light. On the other hand, the one-fluid form of battery may be used with advantage for purposes where a short, steady, and powerful action is required.

To prevent in a great degree the escape of the fumes usually arising by reason of the volatile nature of the acid employed in both forms of battery, more especially where the acid of the negative solution is undiluted, I have found it advantageous to cover the solution in the battery with a thin film of oil, soot, powdered charcoal, or other suitable material.

Having thus described the nature of my said invention, and the manner of carrying the same into effect, I wish it to be understood that I do not confine myself to the precise details herein laid down, as the same may be varied without departing from the principle of my invention; but

What I claim is—

1. The employment, in galvanic batteries, of oxalic acid in combination with any solution containing chromium or chromic acid, such that the oxalic acid will so combine chemically with the chromium or chromic acid as to form oxalate of chromium simply, or a compound oxalate containing chromium or chromic acid, as hereinbefore described.

2. The employment of muriate of ammonia, or chloride of ammonium, or sal-ammoniac as an exciting agent for the zinc or positive element where the solution surrounding the carbon or negative element contains chromium or chromic acid, either singly or in combination with a base or salt—as, for instance, bichromate of potash.

3. As a means for regulating the strength of galvanic batteries, an adjustable tube, of glass or other suitable material, with a perforated platinum bottom, or its equivalent, for containing the crystals or other agents serving to maintain the constancy and activity of the negative solution, as hereinbefore described.

R. C. ANDERSON.

Witnesses:
G. F. REDFERN,
A. ALBUTT.